Feb. 6, 1934.    E. G. BRIDGES    1,946,452
GLASSWARE CONVEYER
Filed Nov. 4, 1930
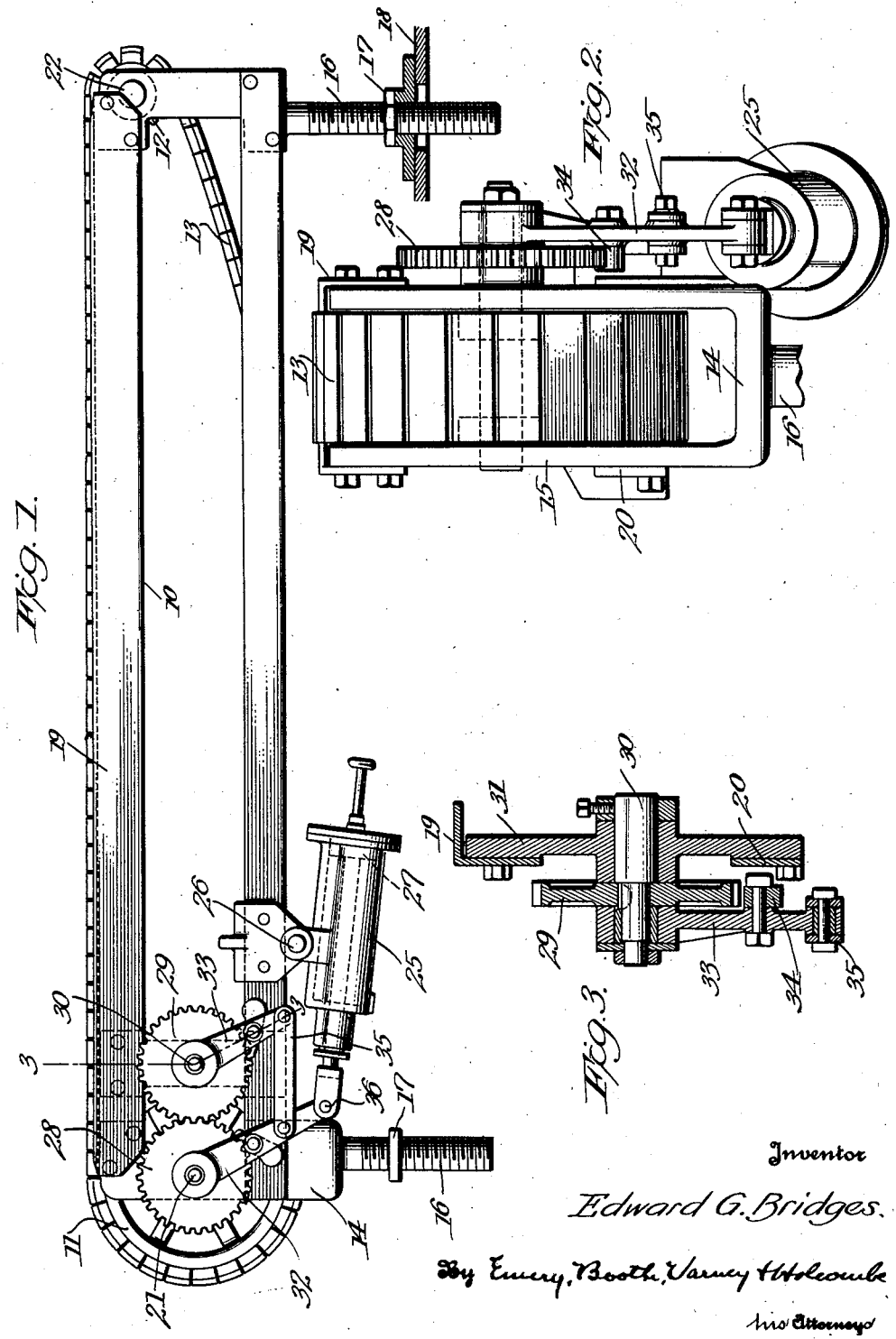
Inventor
Edward G. Bridges.
By Emery, Booth, Varney & Holcombe
his Attorneys Patented Feb. 6, 1934

1,946,452

UNITED STATES PATENT OFFICE 1,946,452

GLASSWARE CONVEYER

Edward G. Bridges, Anderson, Ind., assignor to Lynch Corporation, a corporation of Indiana Application November 4, 1930. Serial No. 493,363

6 Claims. (Cl. 198—135)

The present invention relates to conveyers and more particularly to glassware conveyers such as are employed for conveying formed glassware from glassware forming machines to the annealing lehrs.

In the manufacture of glassware by automatic machinery, according to present day methods, the formed glassware delivered from the forming machine, is deposited upon a conveyer which carries it to the annealing lehrs, where it is picked up manually or mechanically and placed in the lehr. The conveyer, if intermittently operated, must be timed to work in synchronism with the forming machine, and as most forming machines are operated by fluid pressure, it is also advisable to operate the conveyer by fluid pressure.

My present invention relates to glassware conveyers of the intermittent type, and particularly of the fluid pressure operated type, and aims generally to improve existing conveyers of those types.

In order that the invention may be fully understood, reference may be had to the accompanying drawing, illustrating one embodiment of my invention.

In the drawing:

Fig. 1 is a side elevation of my improved conveyer.

Fig. 2 is an end view thereof; and

Fig. 3 is a detail sectional view taken on the line 3—3 of Fig. 1.

In the embodiment of the invention illustrated in the drawing, the conveyer may comprise any suitable frame 10, having suitable supporting and moving means, such as sprocket wheels 11 and 12 for supporting and moving an endless belt 13 which may be of any approved design and construction suitable for the particular ware with which the conveyer is used.

The frame 10 may be composed of end supports 14 which advantageously may be Y-shaped as shown, having upper opposed standards 15 and central depending stem 16, which may be threaded as shown, for the accommodation of clamping nuts 17 for clamping one end of the conveyer frame in any adjusted position in a support 18, which conveniently might be a part of the base frame of the glassware forming machine. Thus it is apparent that the stem 16, being movably mounted in the support 18, permits of moving the conveyer to various angular positions with reference to the forming machine, so that the formed glassware may be arbitrarily delivered to any one of several lehrs at will. The opposite standard 16 may have any suitable base support (not shown) connected to the stem 16 thereof, as will be apparent.

The standards 15 of the upper forked portions of the two supports 14 may be suitably connected by upper and lower side rails 19 and 20, respectively, so as to connect said supports rigidly together. The belt supporting means or sprocket wheels 11 and 12, may be suitably fastened to shafts 21 and 22, respectively, rotatably journaled in suitable bearings in the opposed standards 15 of each support 14, and about which a suitable endless belt 13 may be trained.

Operating means are provided for intermittently moving the belt 13 unidirectionally during each movement of a reciprocable actuator, which advantageously may be a piston of a fluid pressure operated motor, or equivalent device. As shown in the illustrated embodiment, power to operate the conveyer may be supplied by a fluid pressure motor, comprising a cylinder 25, pivotally supported (as at 26) from the frame 10; in which is mounted a reciprocable piston 27 adapted to be moved in opposite directions by fluid pressure alternately admitted to opposite ends of the cylinder 25, as will be understood. Suitable connections are provided between the reciprocable piston 27 and the driving sprocket 11, for moving the belt unidirectionally on each stroke of the piston, so that although the movement of the belt will be intermittent in its motion, the stop periods may be very brief and the glassware may be moved to the lehr in quick succession.

As shown herein, one form of mechanism that has been found suitable for the purpose, comprises a pair of intermeshing gears 28 and 29, one of the gears (as 28) being fast upon the shaft 21 of the driving sprocket 11, and the other gear (as 29) being fixed to a stub shaft 30 journaled in a support 31, connected between the side rails 19 and 20. Arms 32 and 33 are loosely journaled upon the shafts 21 and 30, respectively, and each carries a counterweighted pawl 34 adapted to engage its associated gear, the pawls being reversely arranged so as to rotate the gears in opposite directions. The arms 32 and 33 may be connected for movement in unison by means of link 35, and one of the arms may be pivotally connected (as at 36) to the piston rod of the piston 27.

From the above it will be clear that as fluid pressure is admitted into the rear end of the cylinder 25, for example, the piston 26 will be moved forwardly therein, moving the arms 32 and 33 in a clockwise direction about their respective supporting shafts. The pawl on the arm 32 will slip over the gear 28, but the pawl 34 on the arm 33, being reversely disposed to the opposite pawl, will rotate the gear 29 in a clockwise direction, and being in mesh with the gear 28 will drive the live sprocket 11 and belt 13 in a counter-clockwise direction. As fluid pressure is reversed in cylinder 25, and the piston is moved in the opposite direction, the pawl on the arm 33 will be ineffective while the pawl on the arm 32 will rotate the gear 28, sprocket 11, and the belt in the same direction as before.

The advantages of my invention reside principally in the quick succession of unidirectional movements that may be imparted to the conveyer belt, while retaining the advantages of the intermittent fluid pressure operated conveyer which is admirably suited for use with intermittent fluid pressure operated glassware forming machines in general use in the art. By converting each movement of the reciprocable actuator into a forward movement of the conveyer belt, the time required for conveying the hot glass articles to the annealing lehr is considerably shortened over the prior practice wherein one stroke of the actuator was an idle stroke. Quickening the time required for conveying the hot glass articles to the lehr reduces the loss of heat by radiation and results in diminishing the heat required in the lehr, which permits of quicker annealing of the glass articles and the production of a higher quality of ware.

My invention is not restricted to the details of construction shown and described herein, which is intended only as illustrative of a preferred embodiment thereof.

I claim:

1. In a conveyer for removing glassware in a glassware forming machine and conveying it to a delivery station at a point remote therefrom, an endless conveying member providing a substantially horizontal glassware supporting surface, means for driving said conveying member intermittently in quick succession characterized by the movements of said member being of longer duration than the intervening stop periods which are of momentary duration, such as produced during opposite strokes of a quickly reciprocable actuator.

2. A conveyer for removing glassware from a glassware forming machine and conveying it to a delivery station at a point remote therefrom, an endless conveying member providing a substantially horizontal glassware supporting surface, means for driving said conveying member intermittently in quick succession characterized by the movements of said member being quickly recurring and intervened by momentary stop periods of substantially less duration than the moving periods such as produced during opposite strokes of a quickly reciprocable actuator.

3. In a conveyer for removing glassware in a glassware forming machine and conveying it to a delivery station at a point remote therefrom, an endless conveying member providing a substantially horizontal glassware supporting surface, means for driving said conveying member intermittently in quick succession characterized by the movements of said member being of longer duration than the intervening stop periods which are of momentary duration, said driving means including a reciprocable pneumatically operated actuator, and driving connections between said actuator and conveying member for imparting to said conveying member unidirectional movements during opposite strokes of the actuator.

4. A conveyer for removing glassware from a glassware forming machine and conveying it to a delivery station at a point remote therefrom, an endless conveying member providing a substantially horizontal glassware supporting surface, means for driving said conveying member intermittently in quick succession characterized by the movements of said member being quickly recurring and intervened by momentary stop periods of substantially less duration than the moving periods, said driving means including a reciprocable pneumatically operated actuator, and driving connections between said actuator and conveying member for imparting to said conveying member unidirectional movements during opposite strokes of the actuator.

5. In a conveyer for removing glassware in a glassware forming machine and conveying it to a delivery station at a point remote therefrom, an endless conveying member providing a substantially horizontal glassware supporting surface, means for driving said conveying member intermittently in quick succession characterized by the movements of said member being of longer duration than the intervening stop periods which are of momentary duration, said driving means including a reciprocable pneumatically actuated piston, and reversely acting ratchet mechanism connecting the piston and the conveying member, whereby quickly recurring unidirectional movements are imparted to the conveying member during opposite strokes of the actuator.

6. A conveyer for removing glassware from a glassware forming machine and conveying it to a delivery station at a point remote therefrom, an endless conveying member providing a substantially horizontal glassware supporting surface, means for driving said conveying member intermittently in quick succession characterized by the movements of said member being quickly recurring and intervened by momentary stop periods of substantially less duration than the moving periods, said driving means including a reciprocable pneumatically actuated piston, and reversely acting ratchet mechanism connecting the piston and the conveying member, whereby quickly recurring unidirectional movements are imparted to the conveying member during opposite strokes of the actuator.

EDWARD G. BRIDGES.